United States Patent [19]

Black, Jr. et al.

[11] Patent Number: 4,947,079
[45] Date of Patent: Aug. 7, 1990

[54] NOTCH CUTTING CIRCUIT WITH MINIMAL POWER DISSIPATION

[75] Inventors: Robert A. Black, Jr., Brooklyn Park; Arlon D. Kompelien, Cross Lake, both of Minn.

[73] Assignee: Honeywell Inc., Minneapolis, Minn.

[21] Appl. No.: 239,193

[22] Filed: Aug. 31, 1988

[51] Int. Cl.⁵ .................... H05B 41/14; H01J 17/36
[52] U.S. Cl. .................... 315/205; 315/226; 315/248; 315/DIG. 4
[58] Field of Search .............. 315/205, 209 R, 226, 315/246, 248, 287, 291, 308, DIG. 4

[56] References Cited

U.S. PATENT DOCUMENTS

| | | | |
|---|---|---|---|
| 3,577,011 | 4/1971 | Raffaelli | 307/252 C |
| 3,768,024 | 10/1974 | Letosky | 328/150 |
| 3,950,640 | 4/1976 | Webb et al. | 250/205 |
| 3,956,644 | 5/1976 | Zambre | 307/252 |
| 4,051,394 | 9/1977 | Tieden | 307/310 |
| 4,135,116 | 1/1979 | Smith | 315/158 |
| 4,197,485 | 4/1980 | Nuver | 315/291 |
| 4,229,669 | 10/1980 | Smith | 307/354 |
| 4,231,083 | 10/1980 | Matsuda et al. | 363/135 |
| 4,322,767 | 3/1982 | El Hamamsy et al. | 361/56 |
| 4,346,331 | 8/1982 | Hoge | 315/158 |
| 4,350,935 | 9/1982 | Spira | 315/291 |
| 4,376,969 | 3/1983 | Bedard et al. | 363/78 |
| 4,414,493 | 11/1983 | Henrich | 315/308 |
| 4,455,509 | 6/1984 | Crum et al. | 315/119 |
| 4,464,606 | 8/1984 | Kane | 315/158 |
| 4,476,414 | 10/1984 | Jimerson | 315/240 |
| 4,492,975 | 1/1985 | Yamada et al. | 357/76 |
| 4,527,099 | 4/1985 | Capewell et al. | 315/291 |
| 4,587,459 | 5/1986 | Blake | 315/158 |
| 4,598,198 | 7/1986 | Fayfield | 250/205 |
| 4,687,950 | 8/1987 | Howell | 307/642 |
| 4,697,122 | 9/1987 | Hoffer | 315/158 |
| 4,728,866 | 3/1988 | Capewell et al. | 315/DIG. 4 X |

Primary Examiner—David Mis
Attorney, Agent, or Firm—Kinney & Lange

[57] ABSTRACT

A circuit for cutting a "notch" in an alternating current supply waveform with the minimization of dissipated power comprising a pair of GTO's so poled to conduct current therethrough and also through a pair of power consuming diodes when the switches are "on" during alternate half cycles, the switches being turned "off" at the start of the "notches", and the current is resumed thereafter by a pair of oppositely poled SCR's which are turned "on" and which bypass power diodes so as to conserve power.

19 Claims, 1 Drawing Sheet

NOTCH CUTTING CIRCUIT WITH MINIMAL POWER DISSIPATION

BACKGROUND OF THE INVENTION

1. Field of the Invention.

The present invention relates to a device for creating a notch in a waveform supplied by an alternating power source to a load and more particularly to a load comprising an inductive ballast for a fluorescent light to provide for the dimming thereof.

2. Reference to Other Applications

Two other patent applications filed in the name of the present inventors and assigned to the present assignee, entitled "Power Control For Inductive Loads" and "Time Delay Initialization Circuit," respectively, have been filed on even date herewith and disclose and claim circuits useful in cooperation with the present invention.

3. Description of the Prior Art.

In a co-pending application Ser. No. 898,569, filed Aug. 21, 1986, in the name of L. S. Atherton, R. A. Black, Jr., and A. D. Kompelien, and assigned to the assignee of the present invention, a circuit is described for use with a fluorescent light system to accomplish the dimming thereof by creating a "notch" in the waveform supplied by an alternating power source. The position and width of the "notch" are selected so as to reduce the power supplied to the fluorescent light ballast and thereby accomplish dimming thereof.

In this co-pending application, a pair of power diodes are connected with their cathodes connected to the power source and the load, respectively, and with their anodes connected together to a common node. A pair of unidirectional switches such as "gate turn-off" thyristors (GTO's) are also connected between the power source and the load. A first GTO is connected between the source and the node so as to conduct current from the source to the node during positive half cycles of the alternating supply providing that the GTO is "on". The second GTO is connected between the load and the node so as to conduct current from the load to the node during negative half cycles of the supply providing the GTO is "on". The GTO's are turned "on" during the majority of a cycle from the power source by a control signal being a positive signal applied to the control input or gate thereof from a control circuit. Accordingly, at the beginning of a positive half cycle, current flows from the power source through the first unidirectional switch to the node and from the node through the first power diode to the load. Likewise on the beginning of a negative half cycle, current flows from the load through the second unidirectional switch to the node and from the node through the first power diode to the source.

When it is desired to cut a "notch" in this waveform, the signal to the control electrodes or gates of the unidirectional switches are made negative so that the GTO's turn "off" and current no longer flows in the above-described path, and the load receives no current.

Since GTO's cannot be turned back "on" without consuming considerable switching power, the previous circuit also included a pair of silicon controlled rectifiers (SCR's) connected between the source and the node and one between the node and the load. When turned "on" by a control signal at the gate of each SCR, they conduct current in the same manner as the GTO's, i.e. from the source or the load to the node and then through the power diodes. Accordingly, at the end of the "notch" the first SCR is actuated by a control signal so that current could flow through the SCR to the node and through the power diode to the load for the remaining portion of the positive cycle. At the zero crossover, the silicon-controlled rectifier is automatically turned "off", but by this time the appropriate GTO is turned back "on" and current now flows through the switch and the power diode until the next "notch". At the end of the "notch" in the negative half cycle, the second SCR is turned "on" and current flows from the load through the SCR to the node and then from the node through the power diode to the source for the rest of the half cycle. "Notches" are preferably cut in both the positive and negative half cycles because otherwise a DC bias signal is created which causes undesirable flickering in the fluorescent lamp.

One problem associated with the above-described circuit is that after the notch has been created, the silicon-controlled rectifiers continue to conduct current for the remaining portion of the half cycle, and all of this current flows through the power diodes which consume a large amount of power and produce excessive heat.

SUMMARY OF THE INVENTION

The present invention overcomes this problem by connecting the silicon-controlled rectifiers between the input and the output so that when they are "on", current flows therethrough but not through the power diodes and, accordingly, the power diodes conduct current only during those times when the unidirectional switches are "on", which is only for a small portion of the cycle.

DETAILED DESCRIPTION OF THE PREFERRED EMBODIMENTS

Figure 1:
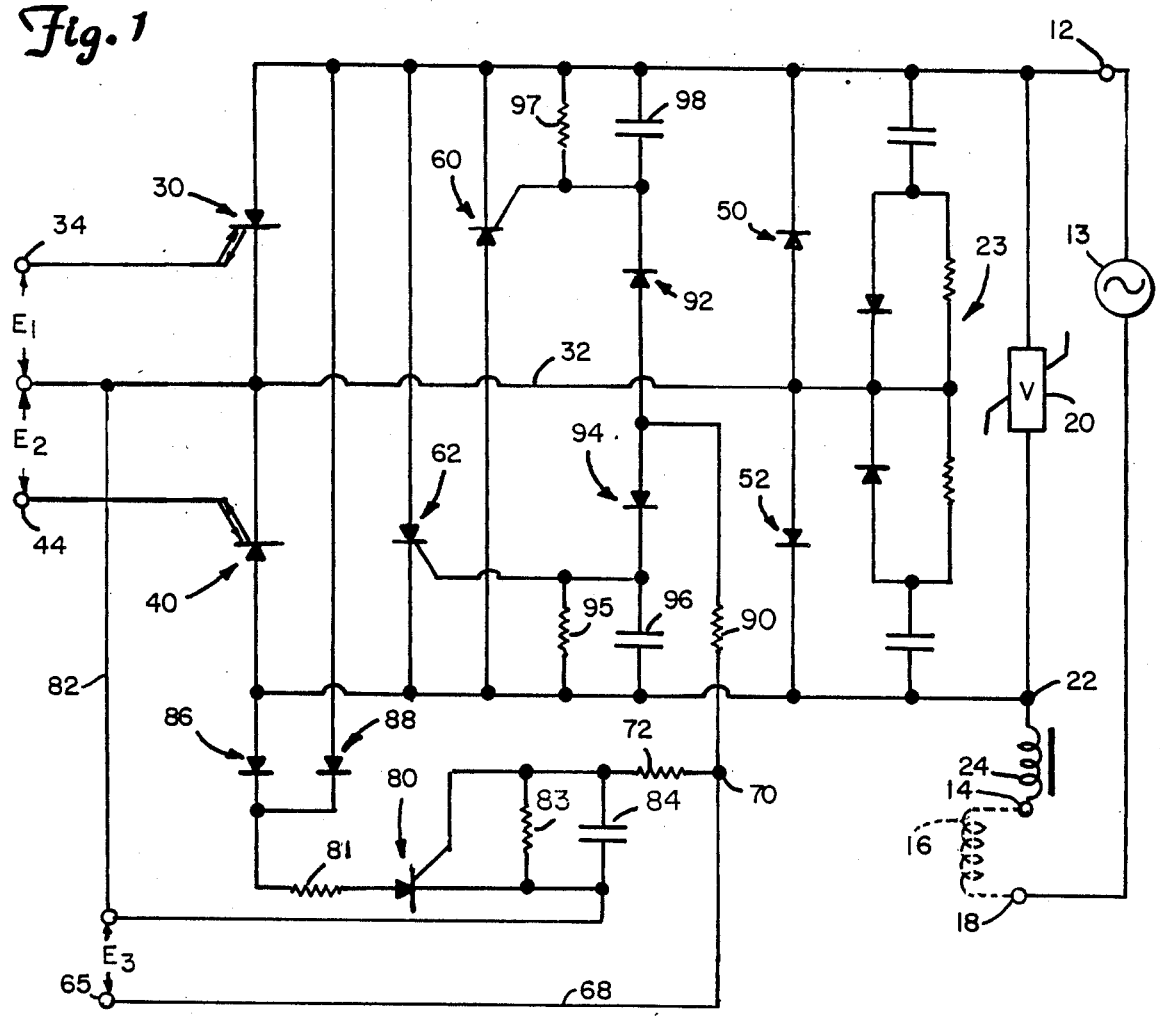
FIG. 1 shows a schematic diagram of the present invention.

In FIG. 1, an input terminal 12 is shown for connection to an alternating current source 13 and, similarly, an output terminal 14 is shown for connection to an inductive load 16 shown in dash lines, the other end of which is connected to AC source 13 return at terminal 18.

A high impedance varistor 20 is connected between the input terminal 12 and a terminal 22 and operates to suppress large voltage transients occurring in the AC power source. A "snubber" circuit 23 is also shown connected between input terminal 12 and terminal 22 in parallel with varistor 20 and comprises a well known combination of resistors, capacitors and diodes for suppressing large voltage swings which are relatively rapid in nature. An inductive choke filter 24 is connected from terminal 22 to the load terminal 14.

A first unidirectional switch in the form of a GTO 30 is shown in FIG. 1 having its anode connected to the input terminal 12, having a cathode connected to a common node conductor 32 and having its gate connected to an input terminal 34 to which a first control voltage, $E_1$, is supplied with respect to node 32 from circuitry similar to that shown in the above-mentioned co-pending application.

A second unidirectional switch in the form of a GTO 40 is shown having an anode connected to the terminal 22, having a cathode connected to the common node 32 and having its gate connected to an input terminal 44 to which a second control voltage, $E_2$, is supplied from circuitry similar to that shown in the above-mentioned co-pending application. The waveforms for voltages $E_1$ and $E_2$ will be explained in connection with FIG. 2 below.

When a positive voltage appears at terminal 34, GTO 30 will be turned "on" so that current can flow from the AC source at terminal 12 through GTO 30 to the common node 32 whenever the input source is in a positive half cycle. Similarly, whenever the positive voltage appears at terminal 44, GTO 40 will be turned "on" so that current can flow from load 16 through terminal 22 and through GTO 40 to common node 32 whenever the input source is in a negative half cycle.

A pair of power diodes 50 and 52 are shown with their anodes connected together to the common node conductor 32 and with their cathodes connected to terminal 12 and terminal 22, respectively. It is seen that when GTO 30 is in an "on" condition, current can flow from terminal 12 through GTO 30, common node 32, power diode 52, and terminal 22 to the load 16 during positive half cycles of the source, and during negative half cycles of the source with GTO 40 in an "on" condition, current can flow from the load 16 to terminal 22, GTO 40, common node conductor 32 and power diode 50 to the terminal 12. It is seen that if positive signals were to exist at terminals 34 and 44 at all times, the load 16 would receive alternating current from the source at all times. This is the situation as it might exist if no dimming of the fluorescent light was required.

When dimming of the light is required, a "notch" is cut into the AC signal waveform as described in the above co-pending application. In the present application, this notch is cut by first causing the GTO's 30 and 40 to be turned "off" at a desired place in the alternating cycle and for a predetermined length of time. This is preferably accomplished by introducing a negative signal at the gate of the GTO's 30 and 40 at the appropriate time to begin a "notch". The negative signal will be produced by circuitry similar to that in the above-described co-pending application, at terminals 34 and 44, respectively, in a manner that will be described hereinafter in connection with FIG. 2.

During the time that GTO's 30 and 40 are in an "off" condition, no current flows to the load 16 and a notch is cut. When it is desired to resume current flow to the load 16, it is preferable not to use the GTO's 30 and 40, as explained above, since to do so would use a significant amount of switching power and conduction losses at that position on the waveform. SCR's have considerably lower conduction losses and, accordingly in FIG. 1, a pair of silicon-controlled rectifiers 60 and 62 are shown connected across the terminals 12 and 22 and poled for current flow in opposite directions. More specifically, the anode of SCR 62 is connected to input terminal 12 and the cathode thereof is connected to terminal 22, while the anode of SCR 60 is connected to terminal 22 and the cathode thereof is connected to input terminal 12. When a control signal appears at the gate terminal of SCR 62, it will be turned "on" and current will flow from terminal 12 through SCR 62 to terminal 22 and to load 16 during positive half cycles of the source. Likewise, when a control signal appears at the gate terminal of SCR 60, it will be turned "on" and current will flow from the load 16 through terminal 22 and through SCR 60 to input terminal 12 during negative half cycles. Unfortunately, SCR's do not have the ability to turn "off" again once they have been turned "on", and they will remain "on" until the input voltage passes through a zero crossover, at which time they will automatically turn "off".

To turn SCR's 60 and 62 to "on" conditions at the end of a notch, a third control signal identified as $E_3$ is applied with respect to node 32 to an input terminal 65 so as to present a positive signal on a conductor 68 to a terminal 70. The positive signal at terminal 70 is passed through a resistor 72 to the gate terminal of a third unidirectional switch 80 which may also be an GTO. GTO 80 has its anode connected to one terminal of a resistor 81 and its cathode connected by a line 82 to common node 32. A noise suppression circuit comprising resistor 83 and capacitor 84, the other terminal of which is connected to the resistor 72.

The other terminal of resistor 81 is connected to 1) the cathode of a diode 86 whose anode is connected to the terminal 22, and to 2) the cathode of a diode 88 whose anode is connected to the terminal 12. Terminal 70 is also connected through a resistor 90 to the anodes of a pair of diodes 92 and 94. The cathode of diode 94 is connected to the control terminal or gate of SCR 62, while the cathode of diode 92 is connected to the control terminal or gate of SCR 60. A noise suppression circuit comprising resistor 95 and a capacitor 96 are shown connected between the cathode of diode 94 and terminal 22, and a noise suppression circuit comprising resistor 97 and capacitor 98 are shown connected between the cathode of diode 92 and input terminal 12.

A positive signal at terminal 65 will operate to turn GTO 80 to an "on" condition, thereby establishing a path during positive half cycles from the terminal 12 through diode 88, resistor 81, GTO 80, and via line 82 to common node 32 and from there down through diode 52 to terminal 22. The signal at terminal 65 also turns SCR 62 "on" through resistor 90 and diode 94. Since common node 32 is "floating" relative to the anode and cathode of SCR 62, the circuit including GTO 80 is necessary to establish a reference so that SCR 62 will receive a definite positive signal at its gate and thereby assure that it is turned "on" when terminal 65 goes positive. In similar fashion, during negative half cycles a positive signal at terminal 65 will turn GTO 80 "on", thereby establishing a circuit from the load 16 through diode 86, resistor 81, GTO 80, and common node 32 up through diode 50 to terminal 12. The signal at terminal 65 also turns SCR 60 "on" through resistor 90 and diode 92. This establishes a path from terminal 65 through resistor 90 and diode 92 to the gate of SCR 60, thereby turning it "on". Again, since node 32 is "floating" relative to SCR 60, the circuit including GTO 80 is necessary to establish a positive signal at the gate of SCR 60 to enable it to be sure to turn "on" when a positive signal appears at terminal 65.

Thus, during positive half cycles, when SCR 62 is "on", a signal from the AC source passes through input terminal 12, SCR 62 to terminal 22 and to load 16, thereby bypassing diode 52 and saving power in a desirable fashion. Likewise, during negative half cycles when SCR 60 is "on", a signal from load 16 passes through terminal 22, SCR 60 to terminal 12, thereby bypassing power diode 50 and saving power in a desirable fashion.

Figure 2:
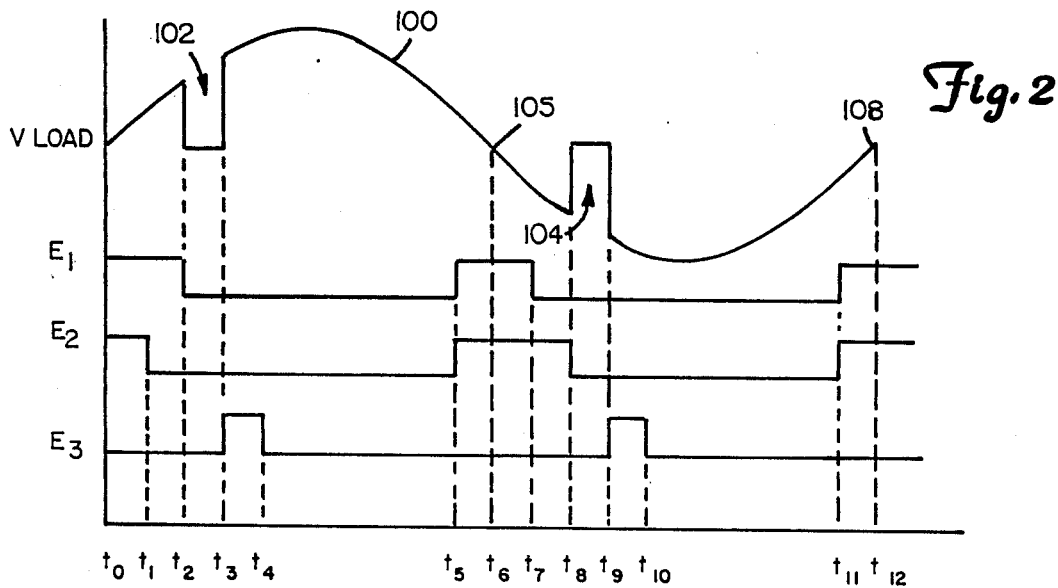
FIG. 2 shows the load voltage waveform generated by the circuit of FIG. 1 and the various control signals utilized to turn the unidirectional switches "on" and "off".

Referring now to FIG. 2, the timing arrangement to create the various operations described in connection with the circuit of FIG. 1 is shown. In FIG. 2, the upper curve 100 represents the alternating current voltage source supply signal waveform into which a pair of notches 102 and 104 are shown to have been cut. At a beginning time $t_0$, waveform 100 is shown to be moving out of a "zero crossing" position, and as explained above, at this time a signal at terminal 34 identified as $E_1$ is positive. Accordingly, current may flow from terminal 12 through GTO 30 to node 32 and through power diode 52 to the load 16. The $E_2$ signal at terminal 44 is also shown to be positive, but GTO 40 cannot conduct since it is reverse biased. The $E_2$ signal is seen to change to a negative signal at time $t_1$ to thereby turn GTO 40 to an "off" condition. At time $t_2$, when it is desired to produce a "notch", the $E_1$ signal at terminal 34 becomes negative, and accordingly the signal from terminal 12 to load 16 is cut off. This continues for however long the negative signal at terminal 34 continues, but at time $t_3$ when it is desired that the notch terminate and that power be again supplied to the load, the $E_3$ signal at terminal 65 becomes positive which causes GTO 80 to conduct, thereby turning "on" SCR 62. Accordingly, from time $t_3$ until the next zero crossing at point 105, the signal from AC source 13 will pass from terminal 12 through SCR 62 to the load 16. Shortly after turning SCR 62 to an "on" condition, the signal at terminal 65 goes negative at time $t_4$ but SCR 62 will remain "on" until the zero crossing 105.

At time $t_5$, shortly before the zero crossing 105 occurs, a positive signal $E_1$ and $E_2$, at terminals 34 and 44, respectively, are again produced, thereby turning GTO's 30 and 40 to an "on" condition. The turning "on" of GTO's 30 and 40 is now at a low point in the AC voltage waveform and less power is dissipated in the switch than would be the case if they had been turned "on" earlier. Accordingly, when SCR 62 goes "off" at time $t_6$, GTO 40 is now "on" so that current can flow from load 16 through terminal 22, GTO 40, and power diode 50 to input terminal 12. GTO 30 will not conduct since it is now reverse biased. This condition continues from time $t_6$ through a time $t_7$ when the $E_1$ signal appearing at terminal 34 goes negative to a time $t_8$ when the $E_2$ signal at terminal 44 goes negative. With the negative signal at terminal 44, GTO 40 is turned "off" and during the time $t_8$ to $t_9$, no current flows from the load 16 so the "notch" 104 of FIG. 2 is carried. At time $t_9$, however, another positive signal $E_3$ at terminal 65 will turn GTO 80 back "on" and thereby turn SCR 60 to an "on" condition. SCR 60 will then conduct current from load 16 through terminal 22, SCR 60 to input terminal 12 during the remainder of the negative half cycle to point 108. At time $t_{10}$, the signal at terminal 65 disappears and GTO 80 goes to an "off" condition. SCR 60 will, however, continue conducting until the next zero crossover. At time $t_{11}$ shortly before the zero crossover at time $t_{12}$, positive signals $E_1$ and $E_2$ at terminals 34 and 44 will turn GTO's 30 and 40 back on to an "on" condition so that the cycle will then repeat.

It is therefore seen that we have supplied a circuit for creating notches 102 and 104 with a minimum use of power dissipating diodes 50 and 52, thereby conserving power.

Although the present invention has been described with reference to preferred embodiments, workers skilled in the art will recognize that changes may be made in form and detail without departing from the spirit and scope of the invention.

What is claimed is:

1. Apparatus for receiving an alternating waveform having positive and negative half cycles at a first terminal, producing a "notched" waveform therefrom and supplying the "notched" waveform to a second terminal comprising:
   first unidirectional switch means operable when "on" to conduct current from the first terminal to a third terminal, the first switch means having an input to receive control signals operable to turn the first switch means "on" and "off";
   second unidirectional switch means operable when "on" to conduct current from the second terminal to the third terminal, the second switch means having an input to receive control signals operable to turn the second switch means "on" and "off";
   first unidirectional conductive means connected to conduct current from the third terminal to the first terminal;
   second unidirectional conductive means connected to conduct current from the third terminal to the second terminal;
   third unidirectional switch means operable when "on" to conduct current from the first terminal to the second terminal, the third switch means having an input to receive control signals operable to turn the third switch means "on";
   fourth unidirectional switch means operable when "on" to conduct current from the second terminal to the first terminal, the fourth switch means having an input to receive control signals operable to turn the fourth switch means "on"; and
   control means connected to the inputs of the first, second, third and fourth switch means to supply the control signals thereto so that (1) during a positive half cycle, current flows from the first terminal to the second terminal through the first switch means and the second conductive means for a first time period and thereafter current flow is stopped from the first terminal to the second terminal for a second time period and thereafter current again flows from the first terminal to the second terminal through the third switch means for a third time period, and (2) during a negative half cycle current flows from the second terminal to the first terminal through the second switch means and the first conductive means for a fourth time period and thereafter current flow is stopped from the second terminal to the first terminal for a fifth time period and thereafter current again flows from the second terminal to the first terminal through the fourth switch means for a sixth time period.

2. Apparatus according to claim 1 wherein the first and second unidirectional switch means are GTO's.

3. Apparatus according to claim 1 wherein the third and fourth switch means are SCR's.

4. Apparatus according to claim 2 wherein the third and fourth switch means are SCR's.

5. Apparatus for creating a "notch" in a waveform supplied by an alternating current source to a load during a period set by control means comprising:
   input means for connection to the source;
   output means for connection to the load;
   common node means;

first unidirectional switch means having first, second and third terminals, said first switch means poled to permit current flow between the first and second terminals only when a control signal is present on the third terminal thereof;

second unidirectional switch means having first, second and third terminals, said second switch means poled to permit current flow between the first and second terminals only when a control signal at the third terminal has turned the second switch means "on";

first unidirectional current flow means having first and second terminals and poled to permit current flow from the first terminal to the second terminal; and first connection means connecting the first terminal of the first switch means to the input means, connecting the second terminal of the first switch means to the common node means, connecting the third terminal of the first switch means to the control means, connecting the first terminal of the second switch means to the input means, connecting the second terminal of the second switch means to the output means, connecting the third terminal of the second switch means to the control means, connecting the first terminal of the first flow means to the common node means and connecting the second terminal of the first flow means to the output means, the control means operating during a first portion of the waveform to turn the first switch means "on" to allow current flow from the input means and through the first switch means, through the first flow means to the output means, during a second portion of the waveform to turn the first switch means "off" to stop current flow from the input means to the output means, and during a third portion of the waveform to turn the second switch means "on" to allow current flow from the input means through the second switch means to the output means bypassing the first flow means.

6. Apparatus according to claim 5 further including:

third unidirectional switch means having first, second and third terminals, said third switch means poled to permit current flow between the first and second terminals only when a control signal is present on the third terminal thereof;

fourth unidirectional switch means having first, second and third terminals, said fourth switch means poled to permit current flow between the first and second terminals only when a control signal at the third terminal has turned the fourth switch means "on";

second unidirectional current flow means having first and second terminals and poled to permit current flow from the first terminal to the second terminal; and second connection means connecting the first terminal of the third switch means to the output means, connecting the second terminal of the third switch means to the common node means, connecting the third terminal of the third switch means to the control means, connecting the first terminal of the fourth switch means to the output means, connecting the second terminal of the fourth switch means to the input means, connecting the third terminal of the fourth switch means to the control means, connecting the first terminal of the second flow means to the common node means and connecting the second terminal of the second flow means to the input means, the control means operating during a fourth portion of the waveform to turn the fourth switch means "on" to allow current flow from the output means and through the fourth switch means, through the second flow means to the input means, during a fifth portion of the waveform to turn the fourth switch means "off" to stop current flow from the output means to the input means, and during a sixth portion of the waveform, to turn the fourth switch means "on" to allow current flow from the output means through the fourth switch means to the input means bypassing the second flow means.

7. Apparatus according to claim 6 wherein the first and third switch means are GTO's.

8. Apparatus according to claim 6 wherein the second and fourth switch means are SCR's.

9. Apparatus according to claim 7 wherein the second and fourth switch means are SCR's.

10. Apparatus for cutting a "notch" in a waveform having first and second polarity half cycles supplied to an inductive load from a source of alternating power comprising:

first SCR means connected between the source and the load and operable when "on" to conduct current from the source to the load;

second SCR means connected between the source and the load and operable when "on" to conduct current from the load to the source;

first diode means connected between the source and a junction point and poled to conduct current from the junction point to the source;

second diode means connected between the load and the junction point and poled to conduct current from the junction point to the load;

first unidirectional "on" and "off" switch means connected between the source and the junction point and operable in the "on" condition to conduct current from the source to the junction point; and second unidirectional "on" and "off" switch means connected between the load and the junction point and operable in the "on" condition to conduct current from the load to the junction point.

11. Apparatus according to claim 10 further including control means operable (a) at least by the start of a first polarity half cycle in the waveform to turn the first switch means "on", (b) at the start of a "notch" to turn the first switch means "off", and (c) at the end of the "notch" to turn the first SCR means "on".

12. Apparatus according to claim 11 wherein the control means is further operable (d) at least by the start of a second polarity half cycle in the waveform to turn the second switch means "on", (e) at the start of a "notch" to turn the second switch means "off", and (f) at the end of the "notch" to turn the second SCR means "on".

13. Apparatus according to claim 12 wherein the inductive load is a portion of a fluorescent lamp and the position and duration of the "notch" controls the dimming of the lamp.

14. Apparatus according to claim 13 wherein the first and second switches are GTO's.

15. In a circuit for cutting a "notch" in a waveform having positive and negative half cycles supplied to a load by an alternating voltage source having an input terminal for connection to the source, having an output terminal for connection to the load, having a common node terminal having first and second switches each having a control input and being connected to conduct current from the input and output terminals, respectively, to the common node terminal, having first and second unidirectional conductors connected to conduct current from the common node to the input and output terminals, respectively, having a first SCR having a control input and being connected to conduct current from the input terminal to the output terminal, having a second SCR having a control input and being connected to conduct current from the output terminal to the input terminal, and having control means operable to produce first, second and third voltage outputs with respect to the common node terminal;

first connection means connecting the first voltage output to the control input of the first switch;

second connection means connecting the second voltage output to the control input of the second switch; and third connection means connecting the third voltage output to the control inputs of the first and second SCR's, the control means operable to produce the first voltage during a first part of a positive half cycle to turn the first switch "on" and permit current flow from the input terminal through the first switch and the second unidirectional conductor to the output terminal, at the start of a "notch" in the positive half cycle, removing the first voltage to turn the first switch means "off", and at the end of the "notch" during the positive half cycle producing the third voltage to turn the first SCR "on" to permit current flow from the input terminal therethrough to the output terminal bypassing the first unidirectional conductor, the control means being further operable to produce the second voltage during a first part of a negative half cycle to turn the second switch means "on" and permit current flow from the output terminal through the second switch and the first unidirectional conductor to the input terminal, at the start of a "notch" in the negative half cycle, removing the second voltage to turn the second switch means "off", and at the end of the "notch", during the negative half cycle, producing the third voltage to turn the second SCR "on" to permit current flow from the output terminal therethrough to the input terminal bypassing the second unidirectinal conductor.

16. Apparatus according to claim 15 wherein the third connection means includes a third switch having a control input connected to receive the third voltage output to turn the third switch "on", the third switch means, when "on", enabling the third voltage output to bias the control input of the first SCR during a positive half cycle and to bias the control input of the second SCR during a negative half cycle.

17. Apparatus according to claim 16 further including a third unidirectional conductor connected between the third switch and the control input of the first SCR and a fourth unidirectional conductor connected between the third switch and the control input of the second SCR.

18. Apparatus according to claim 15 wherein the first and second switches are GTO's.

19. Apparatus to produce "notches" in the alternating waveform having positive and negative half cycles supplied to a first terminal and supply the "notched" waveform to a second terminal comprising:

first unidirectional switch means operable when "on" to conduct current from the first terminal to a third terminal, the first switch means having an input to receive control signals to turn the first switch means "on" and "off";

second unidirectional switch means operable when "on" to conduct current from the second terminal to the third terminal, the second switch means having an input to receive control signals to turn the second switch means "on" and "off";

first unidirectional conductive means operable to conduct current from the third terminal to the first terminal;

second unidirectional conductive means operable to conduct current from the third terminal to the second terminal;

third unidirectional switch means operable when "on" to conduct current from the first terminal to the second terminal, the third switch means having an input to receive control signals to turn the third switch means "on", the third switch means turning "off" whenever the alternating waveform is in a negative half cycle;

fourth unidirectional switch means operable when "on" to conduct current from the second terminal to the first terminal, the fourth switch means having an input to receive control signals to turn the fourth switch means "on", the fourth switch means turning "off" whenever the alternating waveform is in a positive half cycle; and control means connected to the inputs of the first, second, third and fourth switch means to supply the control signals thereto so that (1) during a positive half cycle current flows from the first terminal to the second terminal through the first switch means and the second conductive means, the current flow being interrupted when the control means supplies an "off" control signal to the first switch means, the current again flowing from the first terminal to the second terminal when the control means supplies an "on" control signal to the third switch means, and (2) during a negative half cycle, current flows from the second terminal to the first terminal through the second switch means and the first conductive means, current flow being interrupted when the control means supplies an "off" control signal to the second switch means, the current again flowing from the second terminal to the first terminal when the control means supplies an "on" control signal to the fourth switch means.

* * * * *